United States Patent [19]

McGrew

[11] Patent Number: 4,484,647

[45] Date of Patent: Nov. 27, 1984

[54] APPARATUS FOR GUIDING A VEHICLE PULLING AN IMPLEMENT INCLUDING TRENCH FORMING AND FOLLOWING MEANS

[76] Inventor: John McGrew, 1005 Cameo Dr., Theif River Falls, Minn. 56701

[21] Appl. No.: 376,522

[22] Filed: May 10, 1982

[51] Int. Cl.³ .............................................. A01B 69/04
[52] U.S. Cl. ...................................... 180/131; 172/26
[58] Field of Search ..................... 172/5, 6, 23, 26, 98, 172/446, 476, 667; 56/10.2, 15.4; 180/79, 131; 104/244.1

[56] References Cited

U.S. PATENT DOCUMENTS

| 127,453 | 6/1872 | Bowen. | |
|---|---|---|---|
| 1,256,632 | 2/1918 | Abbott. | |
| 1,486,355 | 3/1924 | Murray. | |
| 1,601,944 | 10/1926 | Davidson et al. | |
| 2,842,039 | 7/1958 | Swingle. | |
| 3,118,505 | 1/1964 | Sieling | 172/6 |
| 3,235,009 | 2/1966 | Nelson | 172/1 |
| 3,797,602 | 3/1974 | Sumida | 180/131 |
| 3,844,372 | 10/1974 | Neece | 180/131 |
| 3,998,275 | 12/1976 | Eisenhardt | 172/26 |
| 4,180,133 | 12/1979 | Collogan et al. | 172/26 |
| 4,184,551 | 1/1980 | Orthman | 172/26 |

OTHER PUBLICATIONS

"Guidance Systems do a Better Job", *Farm Industry News Midwest*, Jan. 1981.

*Primary Examiner*—Richard T. Stouffer

*Attorney, Agent, or Firm*—Merchant, Gould, Smith, Edell, Welter & Schmidt

[57] ABSTRACT

An apparatus (20) for guiding a vehicle (26) along a pre-determined path. The apparatus (20) includes a reversible electric motor (40) and mechanical linkage (42) for interconnecting the motor (40) to the steering mechanism. A carriage (22) is removably attached to the vehicle (26) or implement (24) being pulled thereby. The carriage (22) supports a trench forming apparatus and a wheel apparatus for following a precut trench. The apparatus (20) includes an actuator (32) for raising and lowering the wheel apparatus and a universal joint (31) to enable the wheel apparatus to move from side to side and vertically, whereby the wheel apparatus can remain in the precut trench should the vehicle (26) veer from the path of the precut trench. Additionally, the carriage (22) includes a first switch (38) normally activated when the wheel apparatus is in a lowered position and following a precut trench, the first switch (38) being deactivated when the wheel apparatus is in a raised position, and a second switch (48) having first and second activated states, the second switch (48) normally deactivated when the wheel apparatus is not moving sideways and activated when the wheel means is moving sideways. The guiding apparatus (20) further includes a source of electrical energy (131) and a plurality of conductors (78) electrically coupling the electrical source (131), the motor (40) and the switches (38, 48) such that the motor (40) is energized to move the steering mechanism such that the vehicle (26) does not veer from the path of the precut trench which the wheel apparatus is following.

17 Claims, 17 Drawing Figures

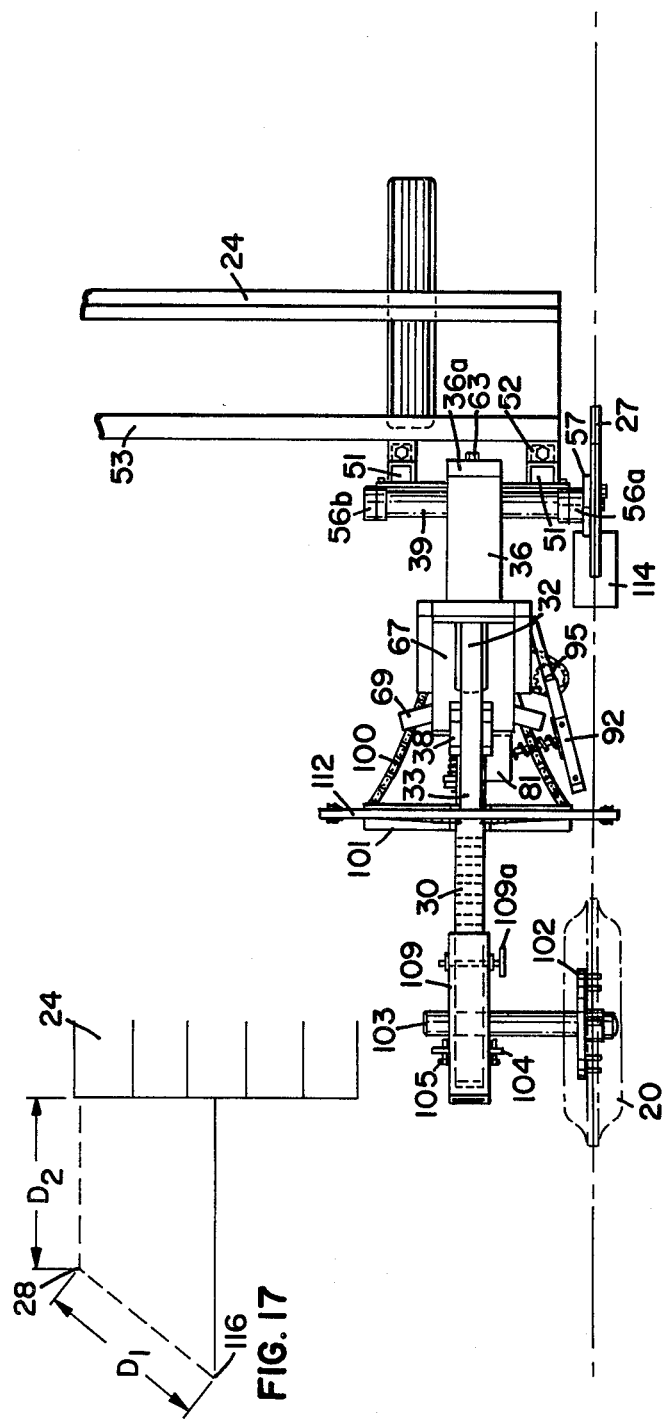

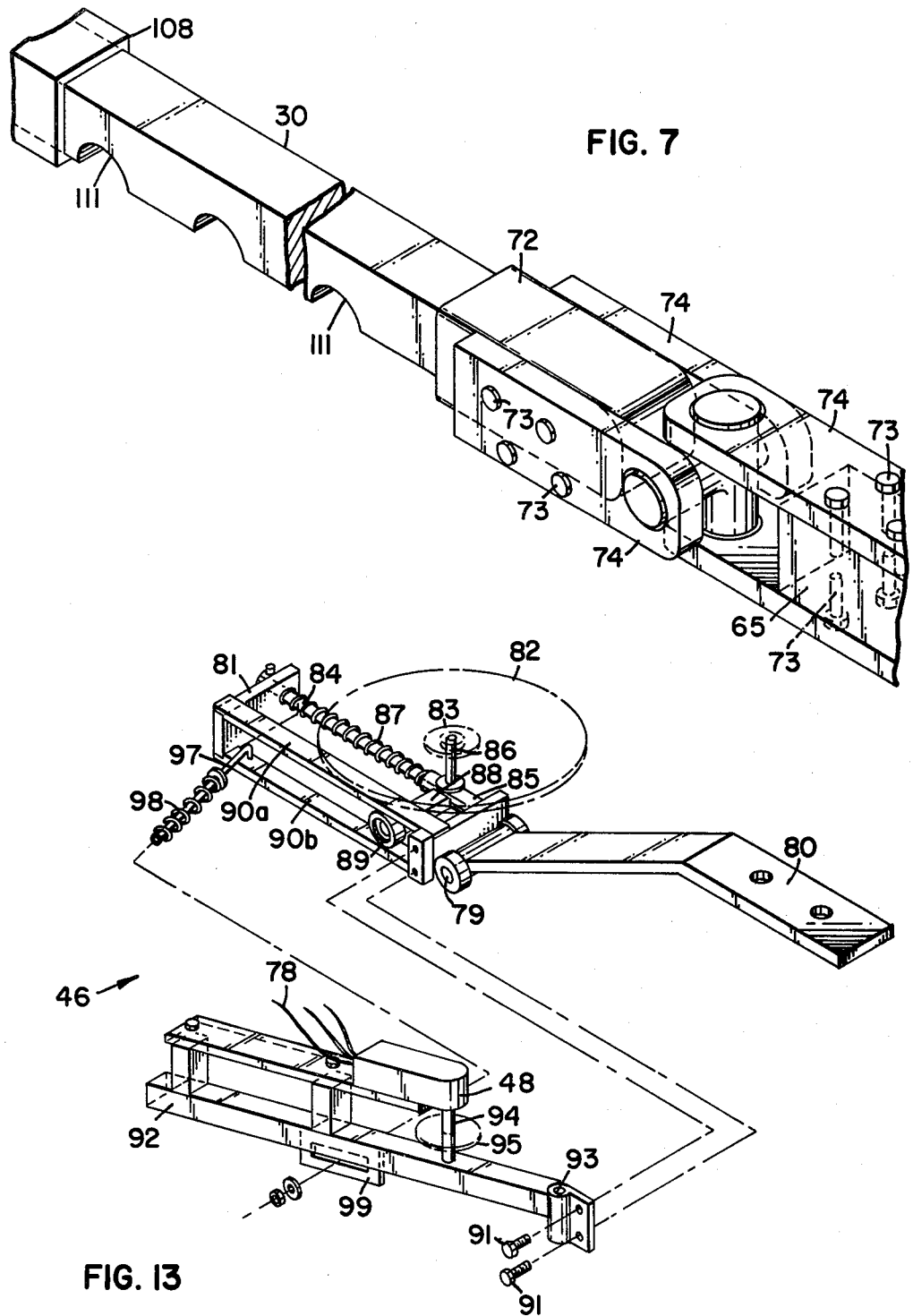

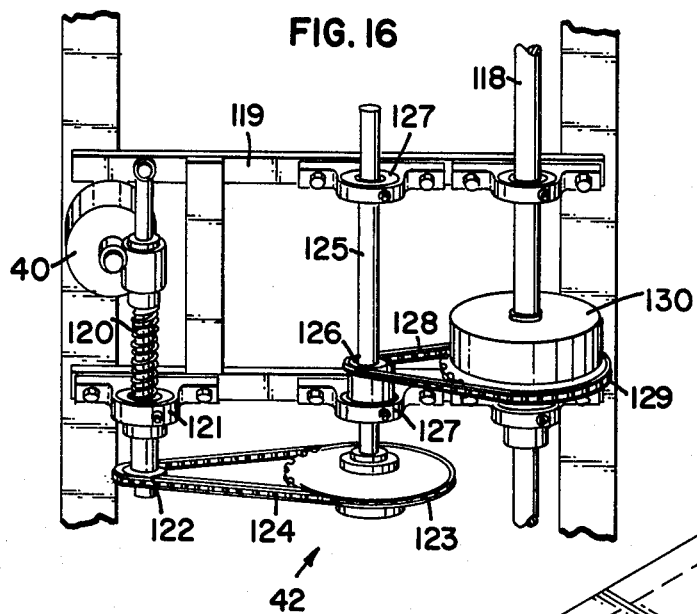
FIG. 16
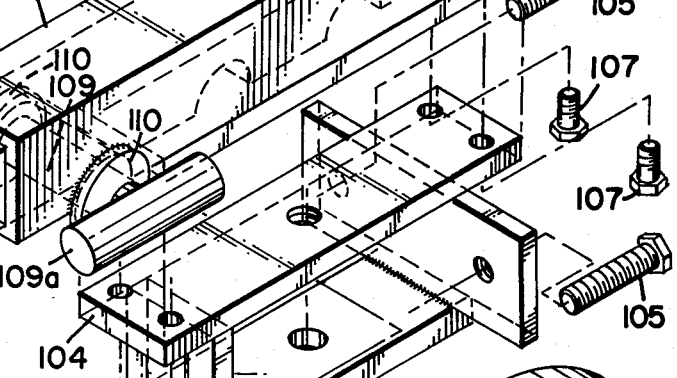
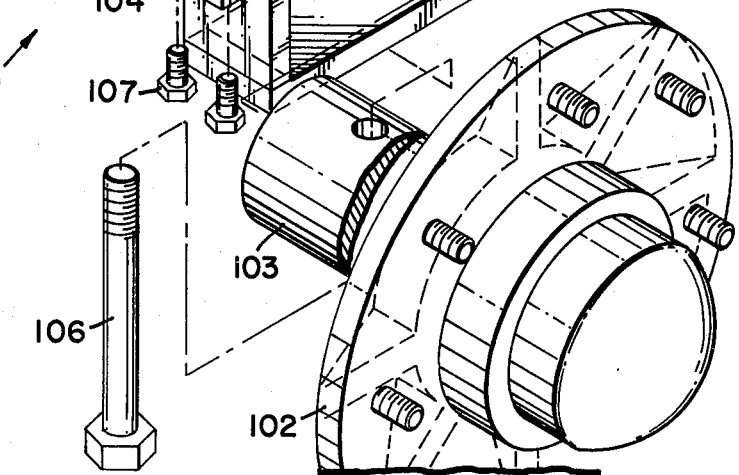
FIG. 8

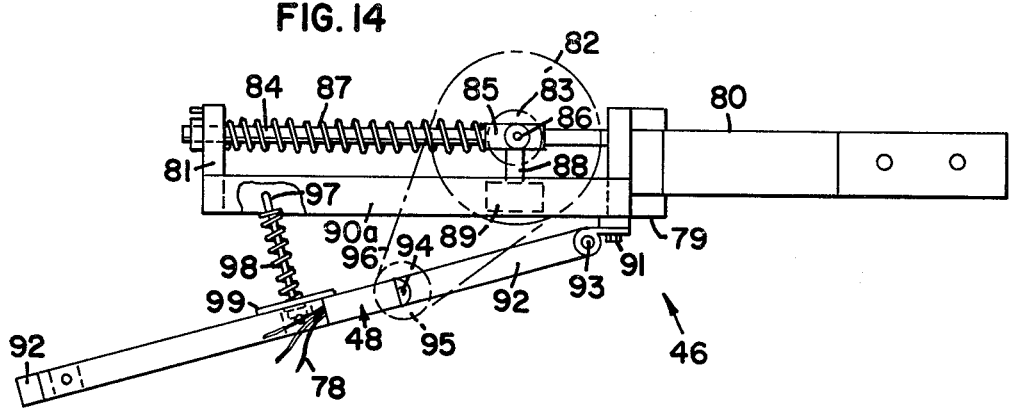
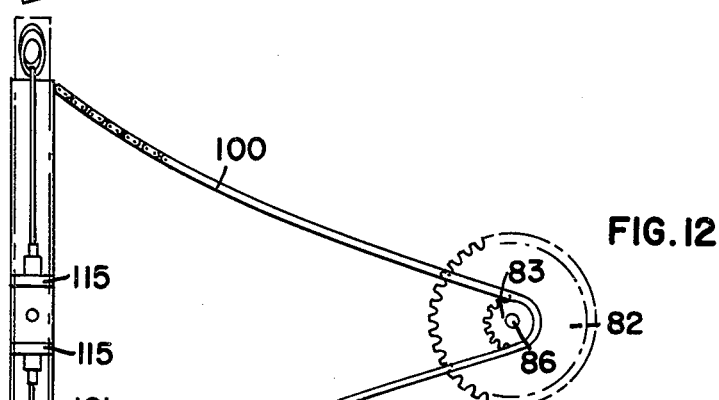
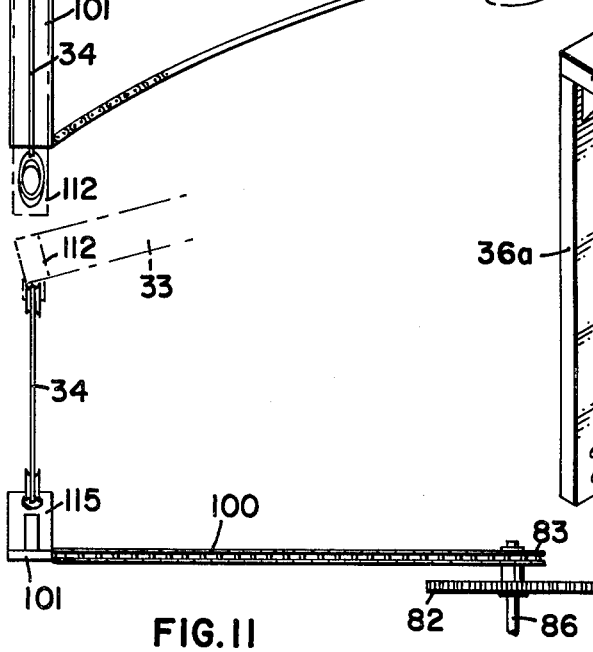
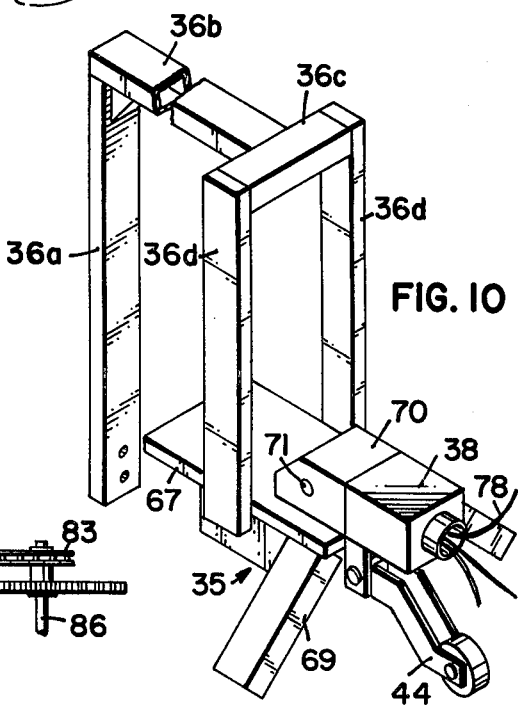

APPARATUS FOR GUIDING A VEHICLE PULLING AN IMPLEMENT INCLUDING TRENCH FORMING AND FOLLOWING MEANS

TECHNICAL FIELD

The present invention relates to an apparatus for guiding a vehicle along a predetermined path. More particularly, the present invention relates to an apparatus for mounting on an implement which is being towed behind a tractor or the like. The guiding apparatus has a wheel mechanism for following a precut trench and a trench mechanism for simultaneously forming a trench for the wheel mechanism to follow on a subsequent path by the tractor/implement.

BACKGROUND OF THE INVENTION

Systems for remotely guiding vehicles by operator control or in accordance with an automatic guide mechanism which follows a pre-established path have been long known in the art. Remote control systems frequently utilize complex servo mechanisms and other various electronic circuitry. Other systems rely on electronic sensors for detecting guide markers previously implanted in the ground. These largely electronic systems require much cost and maintenance to assure their reliability over extended periods of use. In addition, repair of these units necessitates a person with an electronics background and associated electronic support tools for repair and maintenance. Furthermore, the front end cost of such a guide apparatus is substantial.

It is therefore highly desirable that a guide apparatus be developed which is accurate, rugged and basically mechanical in nature so as to circumvent some of the draw-backs associated with largely electronic systems. In response to this need, mechanical guidance apparatus such as disclosed in U.S. Pat. No. 3,797,602 (Sumida) have been developed. However, while Sumida overcomes many of the problems associated with largely electronic systems, there are many problems associated with Sumida.

Sumida does not disclose an integrated wheel mechanism and trench cutting mechanism. In Sumida, a trench cutting mechanism is shown as being separately attached to the farm implement. The trench cutting mechanism must be extended a substantial distance beyond the side of the implement so that guide trenches for a succeeding path are formed so as to assure there will be no overlap in the area of the field being worked by the implement. This makes the implement more bulky and less easy to maneuver. If the trench cutting mechanism is attached adjacent the side of the implement, there will be substantial overlap of the area of the field being worked by the implement on subsequent passes thereby requiring more passes to work a given field area. Such a configuration would also make Sumida useless in chemical applications where there can be no overlap.

Furthermore, Sumida discloses no apparatus for controlling the operation of the trench cutting mechanism. The trench cutting mechanism is passive in nature and is shown as operatively engaging the ground at all times while the implement is working the field. This requires more pulling power and makes the implement more difficult to control. More ever, Sumida discloses no method for raising the trailing wheel mechanism when so desired.

SUMMARY OF THE INVENTION

The present invention relates to an apparatus for guiding a vehicle having a conventional steering apparatus. The apparatus includes means for forming a trench in the surface of the ground. The trench forming means includes an elongated member fixedly attached to the end of a rotatable shaft such that as the rotatable shaft is rotated in a first direction, the elongated member is lowered into a trench forming position and as the rotatable shaft is rotated in a second direction, the elongated arm is raised into a non-trench forming position. A trench following means is interconnected to the rotatable shaft by lift arm means such that as the rotatable shaft rotates in the first direction, the trench following means is raised into a nontrench following position and as the rotatable shaft rotates in the second direction the trench following means is lowered into a trench following position. Actuator means activated under operator control is interconnected with the rotatable shaft for rotating the shaft. The present invention further includes steering correction means responsive to sideways movement of the trench following means and operatively interconnected with the steering apparatus for automatically steering the vehcile such that the vehicle does not veer from the path of the precut trench.

The present invention therefore provides a guidance apparatus which eliminates much of the guess-work or manual "eye balling" associated with row crop operation, chemical application, etc. As a result, there is less strain on the tractor operator. The tractor operator can devote more time to monitoring the actual operation being performed. In addition, the present invention is much more accurate than manual guidance resulting in less overlap and less field being missed during succeeding passes. This is especially true with use of extremely wide implements such as frequently utilized in chemical application and the like where the width of the implement makes it very difficult for the operator to observe where the edge of the implement is positioned. The end result is a saving in time, energy and cost to the farmer.

In one embodiment of the present invention, there are two carriage devices mounted opposite each other at the sides of the implement. Each carriage has a separate wheel mechanism and a separate trench cutting mechanism. The carriage device is operatively interconnected such that when the wheel mechanism of one carriage device is in a lowered trench following position, the trench cutting mechanism of the other carriage device is in a trench cutting position whereby as the vehicle is guided by the wheel mechanism of one carriage device, the trench cutting mechanism of the other carriage device is forming a trench in the field for a subsequent pass. This configuration does not add to the overall width of the implement. In addition, the wheel mechanism and trench cutting mechanism can be raised and lowered by an actuator device so as to be in use only when desired. This reduces implement drag as compared to apparatus wherein the trench cutting mechanism is constantly engaging the surface of the ground and avoids the formation of unwanted trenches.

The carriage devices on which the wheel and trench cutting mechanisms are mounted are removably attached to the implement such that the guiding apparatus can be utilized with several different implements.

The present invention being largely mechanical in nature offers substantial advantages over largely electronic systems with respect to maintenance, reliability and cost.

These and various other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIG. 3 is a top plan view of the present invention;

FIG. 7 is a perspective view of a universal joint connection in accordance with the present invention;

FIG. 8 is an exploded, perspective view of a wheel mounting assembly in accordance with the present invention;

FIG. 10 is a perspective view of an on/off switch device in accordance with the present invention;

FIG. 11 is a side elevational view of a sprocket and chain linkage in accordance with the present invention;

FIG. 12 is a top plan view of the sprocket and chain linkage of FIG. 11;

FIG. 13 is an exploded, perspective view of sensing apparatus in accordance with the present invention;

FIG. 14 is a top plan view of the sensing apparatus of FIG. 13;

FIG. 16 is a perspective view of mechanical linkage in accordance with the present invention; and FIG. 17 is a diagrammatic illustration of relative wheel location in accordance with the present invention.

DETAILED DESCRIPTION OF THE INVENTION

Figure 1:
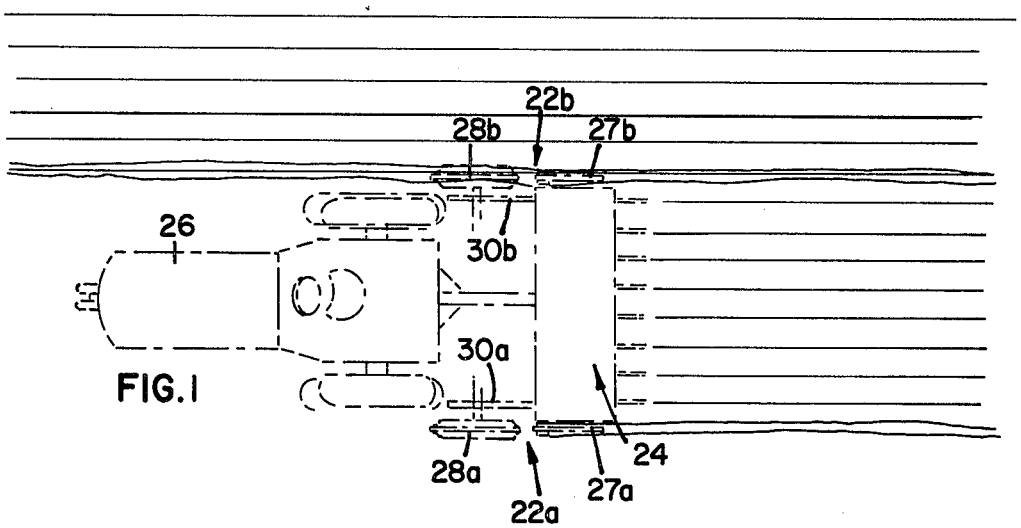
FIG. 1 is a plan view showing a vehicle pulling an implement having guiding apparatus in accordance with the present invention.
Figure 2:
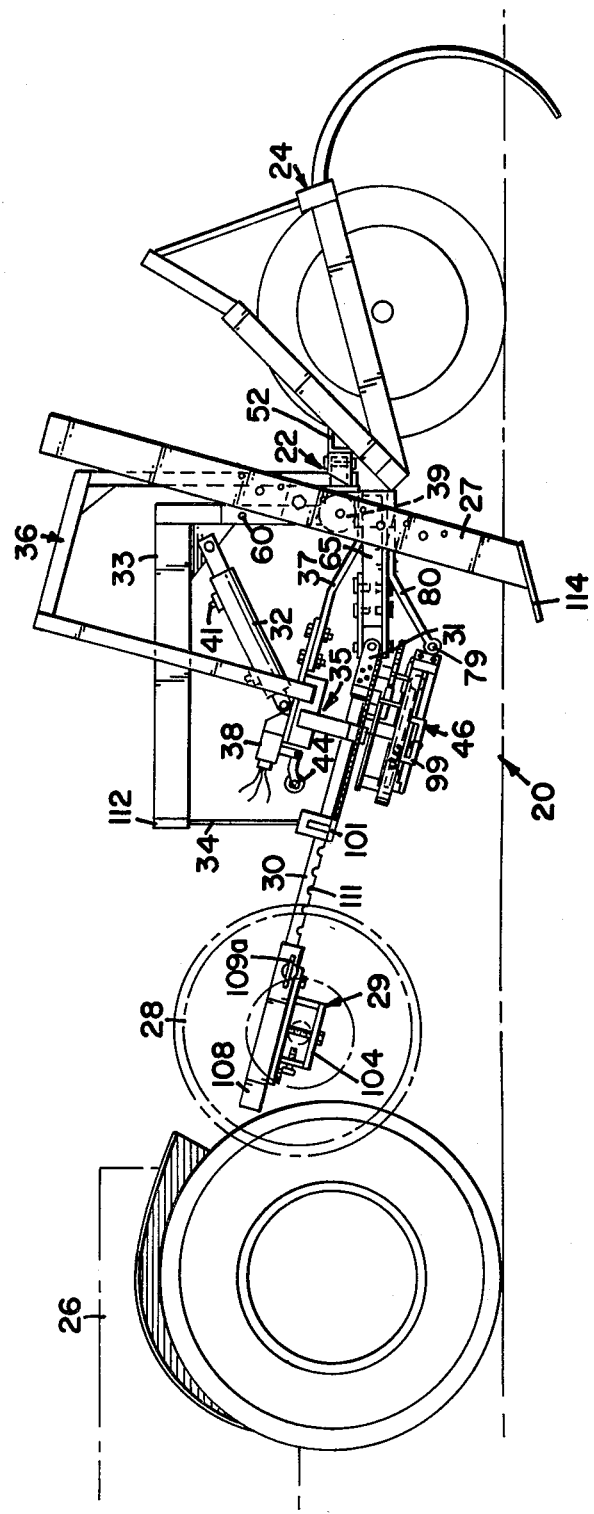
FIG. 2 is a side elevational view of the apparatus in FIG. 1.
Figure 9:
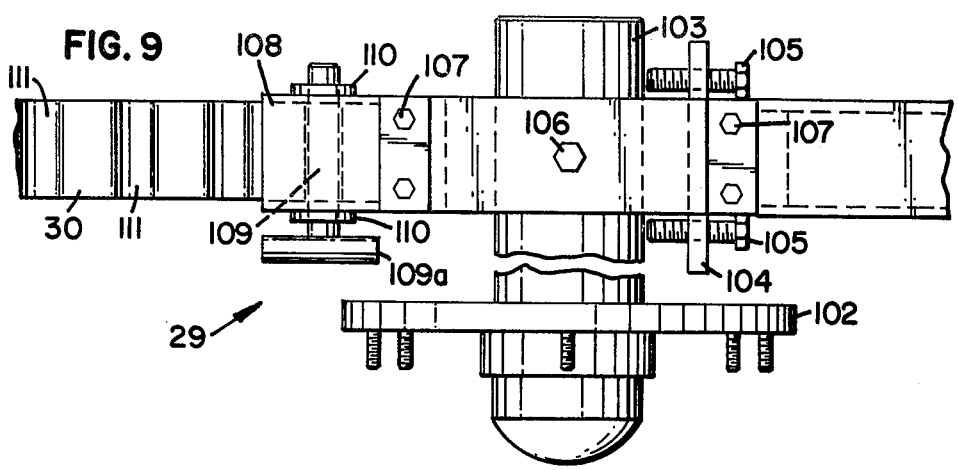
FIG. 9 is a bottom plan view of the wheel mounting assembly of FIG. 8.

Illustrated in FIG. 2 is a preferred embodiment of a guiding apparatus or autopilot 20 of the present invention. Guiding apparatus 20 includes a carriage 22 removably mounted on an implement 24 generally near the side thereof. Implement 24 is typically pulled as illustrated in FIG. 1 by a tractor 26 or the like having a suitable conventional steering apparatus operatively interconnected with guiding apparatus 20 so as to be responsive to steering commands therefrom. Implement 24 may be any one of several different varieties, the present invention having utility with a broad range of implements. It should be further noted that the present invention may also be utilized with self-motorized vehicles or implements.

Guiding apparatus 20 of the present invention further includes a guide trench forming apparatus. In the preferred embodiment shown in FIG. 2, the trench forming apparatus is an elongated arm 27 suitably interconnected to the end of a horizontal rotatable shaft 39 mounted transversely of implement 24 on carriage 22. Elongated arm 27 is thus pivotal in a substantially vertical plane between a ground engaging position wherein said elongated arm 27 forms guide trenches in the surface of the ground and a nontrench forming position.

Adjustably positioned in front of carriage 22 is a trench following apparatus for following in the guide trenches previously formed by elongated arm 27 of the trench forming apparatus. In the preferred embodiment shown, the trench following apparatus includes a ribbed wheel 28 suitably interconnected to rotatable shaft 39 of carriage 22 for substantially vertical movement between a nontrench following position and a trench following position.

In the embodiment shown, ribbed wheel 28 is adjustably mounted by a mounting assembly 29 on a notched elongated arm 30 which in turn is attached to carriage 22 by a universal joint 31. Mounting assembly 29 and universal joint 31 cooperate to allow wheel 28 to move sideways or vertically relative to carriage 22 with little resistance thereof.

The trench forming apparatus and the trench following apparatus are operatively interconnected such that the trench forming apparatus will be in a trench forming position when the trench following apparatus is in a nontrench following position and vice versa. In a typical application, there will be a carriage 22 and its associated trench forming apparatus and trench following apparatus located on each side of an implement as illustrated in FIG. 1. The trench forming apparatus on one side of implement 24 is normally forming a trench while the trench following apparatus on the other side of implement 24 is following in a trench previously formed on a preceeding pass through the field by implement 24.

In the preferred embodiment shown in FIG. 2, a lift arm mechanism activated by an actuator 32 is utilized for raising and lowering the trench following apparatus and for pivoting the trench cutting apparatus by rotation of rotatable shaft 39. The lift arm mechanism includes an L-shaped lift arm 33 which is suitably interconnected to rotatable shaft 39 for pivotal movement in a substantially vertical plane. Lift arm 33 is further attached at the other end thereof by cables 34 to elongated arm 30. Actuator 32 is attached at one end to lift arm 33 and at the other end to a mounting platform 35 which is fixedly attached at the end of an elongated rectangularly shaped member 37. Member 37 is in turn fixedly attached to carriage 22. Platform 35 is further supported by a generally U-shaped cradle arm 36 also fixedly attached to carriage 22. Thus, as actuator 32 extends and retracts, lift arm 33 is pivoted backward and upward or forward and downward thereby lifting or lowering notched elongated arm 30 to which wheel 28 is attached and substantially simultaneously pivoting elongated arm 27.

The present invention further includes a sensing apparatus 46 suitably mounted on each carriage 22 for sending steering signals to a motor driven steering correction apparatus. The steering signals are sent in response to sideways movement of the associated trench following apparatus. An on/off switch 38 is further mounted on each carriage 22 to enable or prohibit the sending of steering signals from sensing apparatus 46. The on/off switch 38 is responsive to movement of the trench following apparatus between a trench following position and a nontrench following position. Thus, when the trench following apparatus is in a trench following position, and on/off switch 38 enables sending signals to the steering correction apparatus and when the trench following apparatus is in a nontrench following position, the on/off switch 38 disables the sending of signals to the steering correction apparatus.

On/off switch 38 in the preferred embodiment is shown in FIG. 2 as being mounted on platform 35. On/off switch 38 is shown as having a trip mechanism 44 which makes contact with elongated notched arm 30 when notched arm 30 is raised by the lift arm mechanism. Upon making contact with elongated notched arm 30, on/off switch 38 effectively prohibits the sending of any steering signals from sensing apparatus 46 to the steering correction apparatus. When the sensing apparatus is enabled by on/off switch 38, the sensing apparatus sends a signal responsive to the sideways movement of wheel 28 to the steering correction apparatus. In the preferred embodiment illustrated in FIG. 16, the steering correction apparatus includes a reversible electric motor 40 attached to the steering apparatus of the vehicle by a mechanical linkage 42. Upon receipt of the steering signal, reversible electric motor 40 via mechanical linkage 42 activates the steering apparatus of tractor 26 such that tractor 26 does not veer from the path of a trench previously cut on a preceeding pass.

Figure 4:
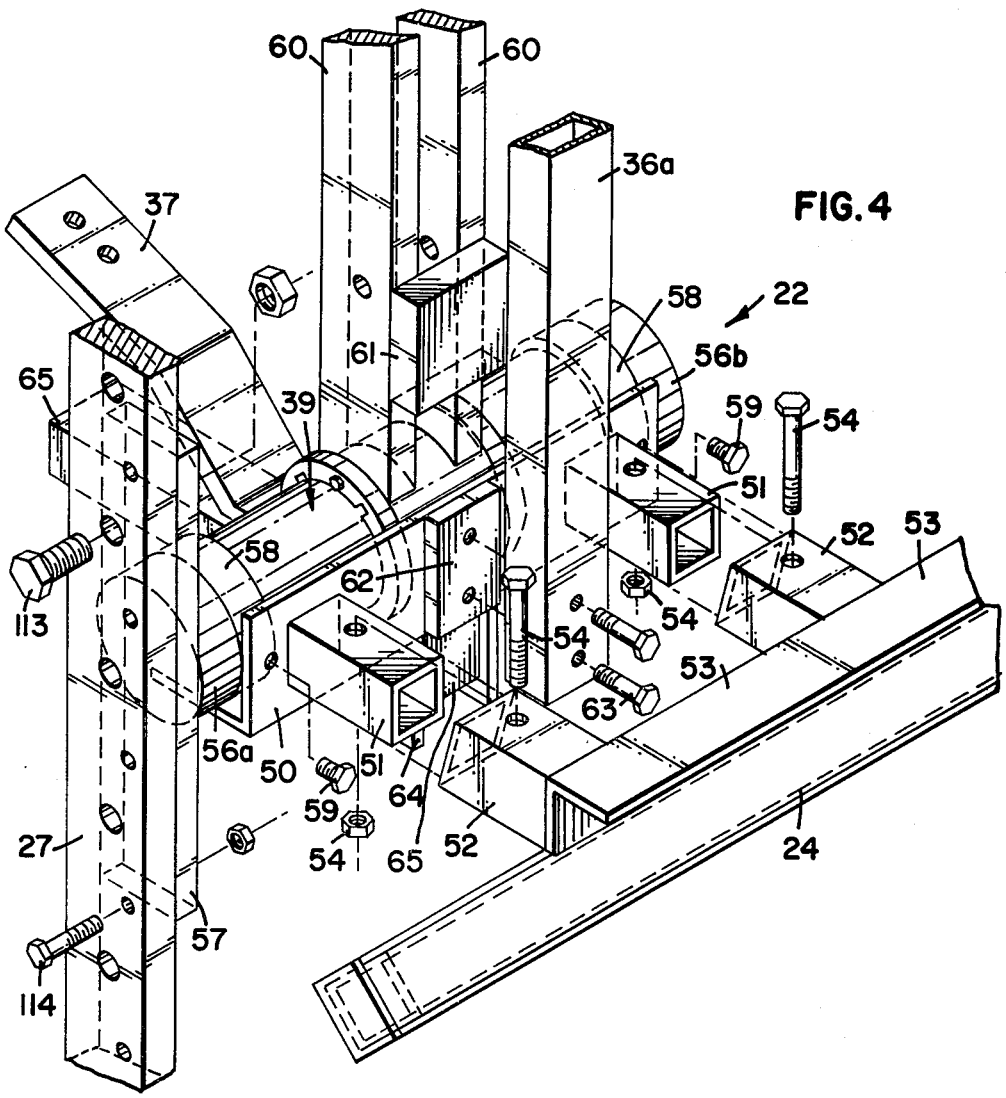
FIG. 4 is an exploded perspective view of a carriage in accordance with the present invention.

More particularly, as illustrated in FIG. 4, carriage 22 of the preferred embodiment includes a piece of angle iron 50 having two hollow rectangular mounting brackets 51 welded to the back side thereof and extending generally horizontally therefrom. Brackets 51 are removably inserted into rectangular receptacles 52. Rectangular receptacles 52 are welded to a piece of angle iron 53 which is suitably attached to implement 24. Note that any suitable structure for removably attaching carriage 22 to implement 24 may be utilized. In the embodiment shown brackets 51 are fastened in receptacles 52 by nut and bolt assemblies 54.

In the embodiment illustrated in FIG. 4, rotatable shaft 39 is rotatably mounted on angle iron 50 by being rotatably mounted in bushings 58 which are drilled and tapped on the backs and bottom thereof for attachment to angle iron 50 by cap screws 59 or the like. Bushings 56a, b are fixedly attached to the ends of shaft 39 so as to rotate therewith. Welded to bushing 56a at the outside end of shaft 39 is a generally vertically extending elongated member 57 which serves as the mounting bracket for elongated arm 27 of the trench cutting apparatus. As shaft 39 rotates, bracket 57 will also rotate thereby placing the trench cutting apparatus in a trench forming position or a non-trench forming position.

As shown in FIG. 4, suitably welded to shaft 39 are two generally parallel vertically upright arms 60. Arms 60 may be reinforced by a spacer 61. As illustrated in FIG. 2, lift arm 33 is suitably attached to uprights 60. Thus as actuator 32 pushes or pulls on lift arm 33, shaft 39 is made to rotate accordingly, thereby raising or lowering wheel 28 and elongated arm 27 of the trench cutting apparatus. The trench cutting apparatus is attached to shaft 39 such that as wheel 28 is raised, elongated arm 27 is lowered into a trench forming position and as wheel 28 is lowered, elongated arm 27 is raised into a non-trench forming position.

Figure 5:
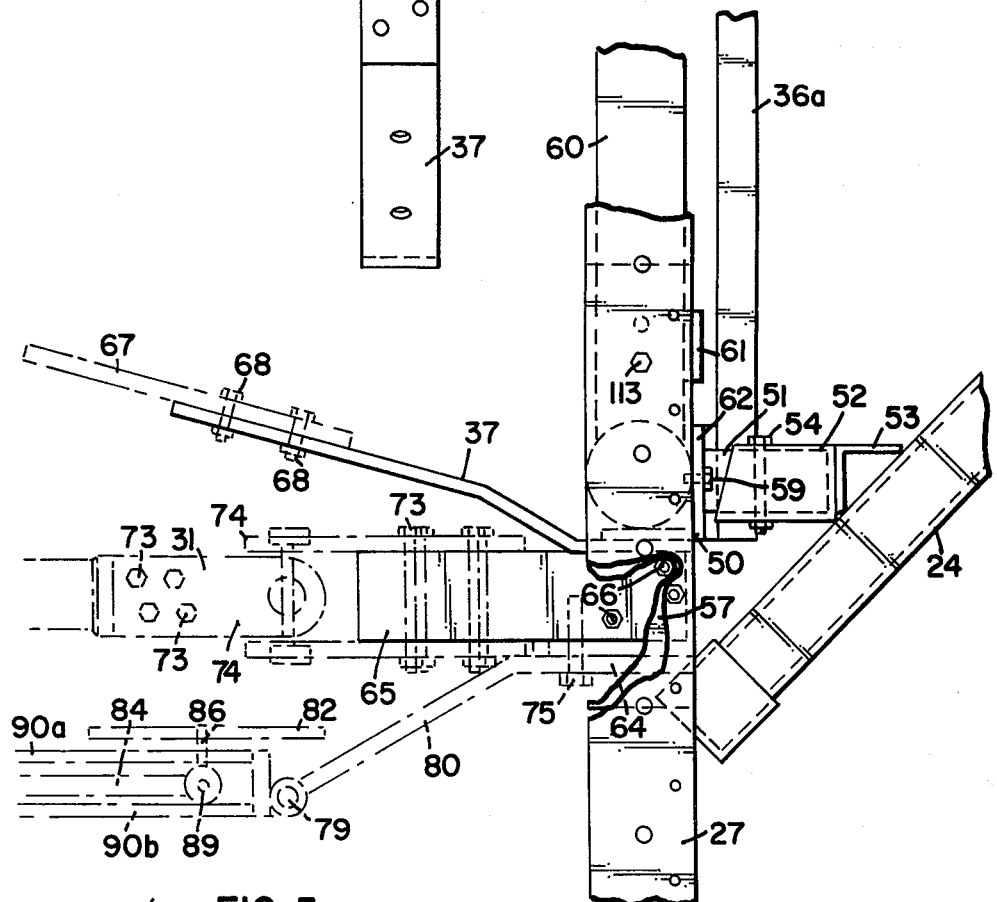
FIG. 5 is a side elevational view of the carriage shown in FIG. 4.

Suitably attached to the bottom of angle iron 50 and extending in front of carriage 22 is elongated member 37. As illustrated in FIG. 5, member 37 is bent upward to allow room for universal joint 31 therebelow.

Figure 6:
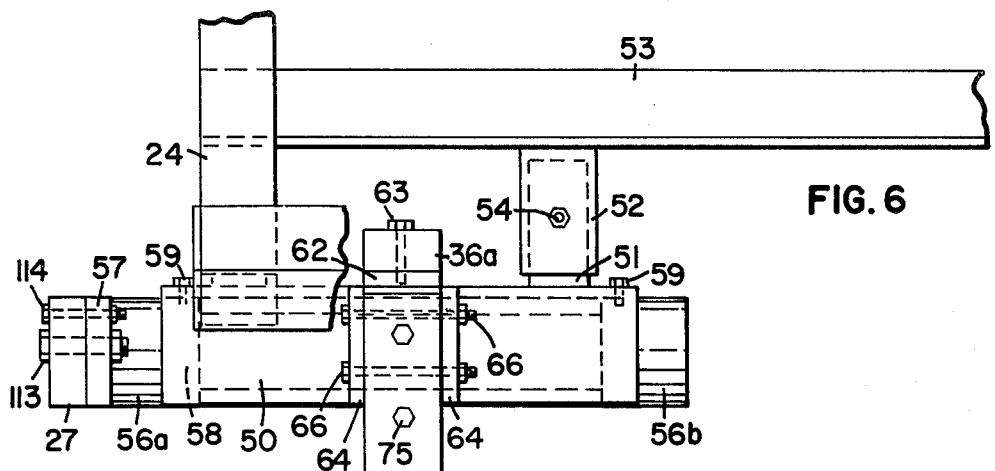
FIG. 6 is a bottom plan view of the carriage shown in FIG. 4.

As illustrated in FIG. 6, welded on edge to the bottom of angle iron 50 are two flat irons 64 which provide for attachment of a rectangular extension 65 which attaches universal joint 31 to carriage 22. Flat irons 64 are attached to extension 65 by nut and bolt assemblies 66.

Illustrated in FIG. 10 is the cradle arm assembly which supports on/off switch 38. Cradle arm 36 includes a generally vertical member 36a and a generally horizontal member 36b. Vertical member 36a is attached to a bracket 62 on the back side of angle iron 50 which is drilled and tapped for cap screws 63 or the like as illustrated in FIG. 4. At the end of horizontal member 36b is a spacer 36c separating two vertically downward extending members 36d which extend downward adjacent to the sides of platform 35.

Mounting platform 35 is suitably attached to elongated member 37 by a plate 67 which, as illustrated in FIG. 5, has apertures therein for reception of nut and bolt assemblies 68. Mounted on top and at the front end of plate 67 is a bracket 70 to which on/off switch 38 is mounted. Extending generally downward at an angle from bracket 35 are two elongated members 69 which serve as a mechanism for centering the wheel apparatus as it is raised by actuator 32 which is attached to bracket 70 at 71. Elongated members 69 thereby assure the wheel apparatus will make contact with the trip mechanism 44 of on/off switch 38. On/off switch 38 has electrical connectors 78 for connection to switch 48 of sensing apparatus 46 and reversible electric motor 40.

Illustrated in FIG. 7 is universal joint 31 of the present invention. A piece of box iron 72 is welded to the end of elongated notched arm 30. Box iron 72 is drilled and tapped four times on two sides. Cap screws 73 or the like are then used to attach two U joint plates 74 to iron 72. Extension member 65 is similarly drilled and tapped four times for receipt of cap screws 73 or the like. In addition, as illustrated in FIGS. 6 and 5 extension member 65 includes two apertures for receipt of nut and bolt assemblies 75 for attaching sensing apparatus 46 thereto.

FIGS. 13 and 14 illustrate a preferred embodiment of sensing apparatus 46 of the present invention. As illustrated in FIG. 5, sensing apparatus 46 is attached to extension arm 65 by an elongated arm 80 which is bent downward so as to allow clearance between U joint 31 and sensing apparatus 46. Arm 80 is pivotally mounted to the back end of a bracket 81 by a hinge 79. Two sprockets 82 and 83 are slidably mounted on a removable shaft 84 which extends between the front and back ends of bracket 81. The sliding assembly includes a piece of bushing stock 85 having a vertical upright pin-like member 86 on which sprockets 82 and 83 are mounted. A spring 87 is positioned circumferentially about shaft 84 between bushing stock 85 and the front end of bracket 81 thereby biasing bushing stock 85 to the back end of bracket 81.

Extending sideways from bushing 85 is an elongated member 88. Member 88 has a bearing 89 suitably attached in the end thereof for sliding in the groove formed by members 90a, b extending the length of bracket 81 on the side opposite from shaft 84. Member 88 serves as a guide to keep pin-like member 86 and its associated sprockets 82 and 83 in an upright position.

A bracket 92 is attached to the side of bracket 81 by cap screws 91 or the like. Bracket 92 is horizontally pivotal about a hinge 93. Mounted on top of bracket 92 is a sensing switch 48. Switch 48 has a vertically extending sensing arm 94 which is attached to a sprocket 95. As illustrated in FIG. 14, sprocket 95 is attached to sprocket 82 by a chain 96. A rod 97 and a spring 98 circumferentially thereabout are connected between bracket 81 and 92 to retain proper tension in chain 96 by biasing bracket 92 away from bracket 81. Rod 97 is pivotally mounted on bracket 81 and slidingly mounted in a slotted bracket 99 attached to bracket 92. Switch 48 has electrical connectors 78 which electrically connect switch 48 with switch 38 and reversible electric motor 40.

As illustrated in FIGS. 11 and 12, sprocket 83 is attached via chain 100 to the ends of an elongated generally horizontal member 101. The tension in chain 100 is maintained by the biasing effect of shaft 84 and spring 87 combination. Member 101 as illustrated in FIGS. 2 and 3 is attached to notched elongated arm 30 so as to extend transversely thereof. In the preferred embodiment shown, horizontal member 101 has two spaced brackets 115 near the center thereof which are attached via cables 34 to the ends of a transversely extending member 112 which in turn is attached to lift arm 33. As arm 30 moves sideways as a result of wheel 28 moving sideways, chain 100 will rotate sprocket 83. As sprocket 83 is made to rotate, sprocket 82 also rotates. Rotation of sprocket 82 causes rotation of sprocket 95 which in turn causes rotation of sensing arm 94. Rotation of sensing arm 94 activates sensing switch 48 to one of two activated states depending on the direction of sideways movement of wheel 28.

Wheel 28 is mounted near the end of notched elongated arm 30 by mounting assembly 29. As illustrated in FIG. 8, assembly 29 includes a hub 102 suitably mounted on a shaft 103. Shaft 103 is removably insertable into a hollow rectangular bracket 104. Bracket 104 has sufficient dimension to allow clearance on the front and back sides of shaft 103 within bracket 104. Bracket 104 and shaft 103 have an aperture therethrough for reception of a vertically extending pin-like member 106. Thus, shaft 103 pivots about member 106 when there is clearance on the sides thereof to allow for pivotal movement. The amount of clearance allowed is adjusted by two bolt-like members 105 which are threaded in from the front end of bracket 104. Thus, shaft 103 may be made stationary or given considerable clearance for pivotal movement about member 106 as required due to working conditions.

Mounted on top of bracket 104 via cap screw assemblies 107 is a hollow rectangular bracket 108. Bracket 108 has sufficient inside diameter to allow the insertion of notched elongated arm 30, which has several grooves 111 along the bottom thereof. Bracket 108 is cut out or notched near the back end thereof so as to allow a pin-like member 109 having a handle 109a to be removably inserted transversely therethrough. Pin-like member 109 is retained in place by two pieces of bushing stock 110 welded to the sides of bracket 108. Mounting assembly 29 can thus be positioned at different positions along elongated arm 30 by sliding arm 30 into bracket 108. Pin 109 is inserted through bushings 110 and retains arm 30 in place by riding in one of the grooves 111 positioned along arm 30. Thus wheel 28 can be positioned at varying distances from implement 24. The distance at which wheel 28 is positioned will affect the responsiveness of guiding apparatus 20. This distance will vary depending on the circumstances, i.e., type of hitch being used, implement, tractor, etc. As illustrated in the diagrammatic illustration of FIG. 17, in certain applications guide apparatus 20 is very responsive if wheel 28 is a distance $D_1$ from tractor hitch 116, which is approximately equal to a distance $D_2$ between wheel 28 and the front end of implement 24.

As shown in FIG. 4, elongated arm 27 of the trench cutting apparatus of the present invention is attached to elongated bracket 57 by nut and bolt assemblies 113 and 114. Elongated arm 27 has two generally vertical rows of apertures thereby allowing arm 27 to be adjusted to varying depths. Nut and bolt assembly 114 is of lesser diameter than nut and bolt assembly 113 so as to function as a shear bolt which gives way when subjected to substantial stress, thereby preventing damage to arm 27 or carriage 22. As illustrated in FIG. 2, welded to the bottom of elongated arm 27 at an angle is a shoe member 114 for forming a precut trench which wheel 28 will follow. The front end of member 114 may be angled to aid in the formation of the trench.

An embodiment of the mechanical linkage 42 which links reversible electric motor 40 to the steering mechanism of tractor 26 is shown in FIG. 16. Any suitable linkage mechanism will suffice. Linkage 42 is shown as being mounted near steering shaft 118 on a framework 119. Connected to reversible electric motor 40 is a reversible screw jack 120. Screw jack 120 is suitably mounted in a pillow block bearing 121 and has a sprocket 122 attached to the end thereof. Sprocket 122 is connected to a sprocket 123 via chain 124. Sprocket 123 is mounted on a shaft 125 suitably supported on pillow block bearings 127. Shaft 125 has a smaller sprocket 126 mounted thereon. Sprocket 126 is connected via chain 128 to a sprocket 129 mounted on steering column 118. Sprocket 129 is bolted to an electromagnetic clutch 130. An electric switch for disengaging or engaging guiding apparatus 20 is preferably located conveniently near the steering column so as to allow the operator to manually steer the tractor or switch over to autopilot as desired.

Figure 15:
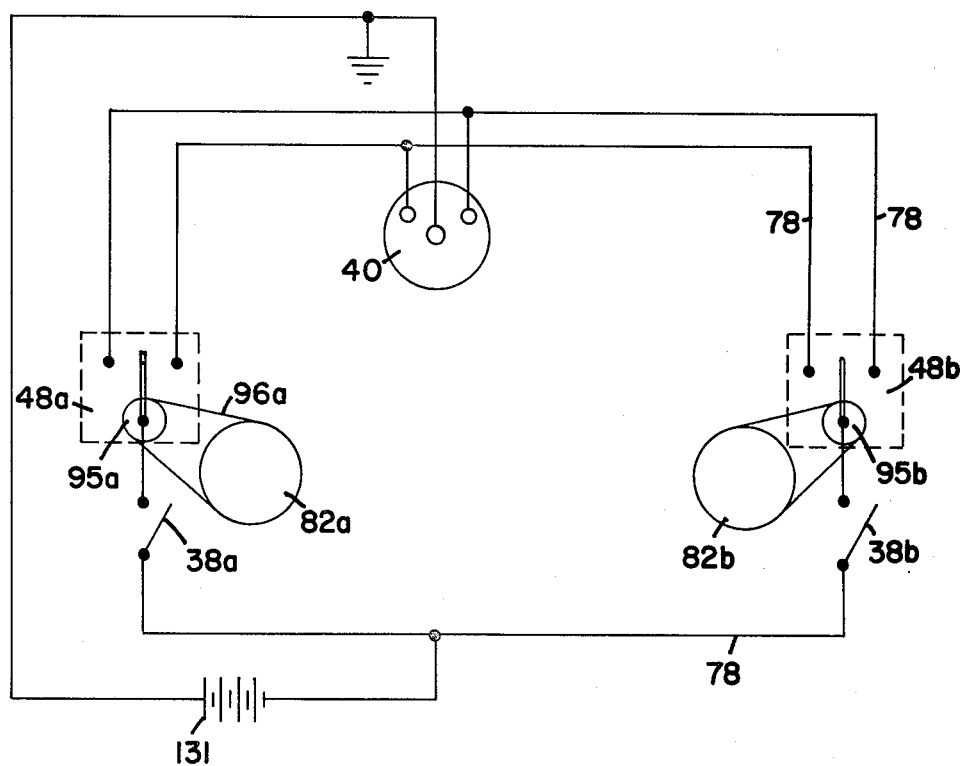
FIG. 15 is a schematic diagram of electrical circuitry in accordance with the present invention.

Illustrated in FIG. 15 is a schematic of the electrical circuitry for one embodiment of the present invention. In normal operation there will be two carriages 22, one mounted on each side of implement 24. Each carriage 22 has an on/off switch 38 and a sensor switch 48 which are interconnected via connectors 78 with reversible electric motor 40 and a power source 131. When wheel 28 is raised by actuator 32 at one of the carriages 22, switch 38 is deactivated so as to effectively disable the sending of steering signals from switch 48 of that particular carriage 22 to reversible electric motor 40. When wheel 28 is lowered, switch 38 is activated or closed thereby enabling the sending of signals from switch 48 of that particular carriage 22 to reversible electric motor 40 so as to energize reversible electric motor 40 as necessary. Switch 48 is deactivated and not sending any turn signals to motor 40 when wheel 28 is not moving sideways and is activated when wheel 28 is moving sideways. Switch 48 is activated to one of two states depending on which direction wheel 28 moves. Activation of switch 48 to a first activated state by movement of wheels 28 in a first sideways direction energizes motor 40 so as to cause linkage mechanism 42 to move the steering mechanism such that the vehicle is veered in a first direction. Activation of switch 48 to a second activated state by movement of wheel 28 in a second sideways direction energizes motor 40 so as to cause linkage mechanism 42 to move the steering mechanism such that the vehicle is steered in a second direction. Thus, the responsiveness of switch 48 to wheel 78 sideways movement assures that the vehicle does not veer from the path of a precut trench thereby enabling very accurate steering of the vehicle.

In use, carriages 22 are normally positioned as illustrated in FIG. 1 such that on a subsequent pass in the field, implement 24 does not rework ground worked on a previously pass and does not miss any ground, thereby assuring maximum efficiency. As illustrated in FIG. 1, wheel 28b is adjacent the portion of the field worked on a previous pass and is following a precut trench which was made by the trench cutting apparatus on the previous pass. Arm 27b of the trench cutting apparatus is raised so as to be in a non-trench cutting position. Wheel 28a on the side of the implement 24 away from the worked portion of the field is in a raised position above the surface of the ground so as to be in a non-trench following position. Arm 27a is lowered so as to be in a trench cutting position so as to form a precut trench for a subsequent pass. Universal joint 31 and mounting assembly 29 associated with wheel 28b enable the movement of wheel 28b from side to side and vertically, thereby enabling wheel 28b to follow the precut trench should tractor 26 veer from the path of the precut trench.

On/off switch 38a associated with wheel 28a is deactivated thereby preventing switch 48a associated with wheel 28a from sending any signals to reversible electric motor 40. On/off switch 38b associated with wheel 28b is activated enabling the sending of turn signals from switch 48b associated with wheel 28b. As previously discussed, movement of wheel 28b activates switch 48b such that a signal is sent to reversible electric motor 40 thereby energizing motor 40 so as to cause linkage mechanism 42 to move the steering mechanism of tractor 26 such that tractor 26 is steered in a corresponding direction. Switch 48b is deactivated once tractor 26 is back on a proper course. Thus tractor 26 does not veer very far from the path of the precut trench thereby enabling very accurate steering of tractor 26. At the end of a row or at any time desired, the operator can switch off guiding apparatus 10 with a switch located near the steering column and take over via manual control. The controls for raising and lowering the wheel apparatus and trench cutting apparatus may be placed anywhere convenient for the operator so as to allow activation of actuator 32 via hydraulic lines 41. The operator may raise both wheel apparatus or lower any one wheel apparatus as needed.

It should be emphasized as previously noted, that the incorporation of guidance apparatus 20 according to the present invention into any suitable vehicle is contemplated and the description thereof in the environment of the farm tractor is exemplary of environments in which the invention is functional and practical.

It is to be understood that even though the numerous characteristics and advantages of the present invention have been set forth in the foregoing description, together with details of the structure and function of the invention, the disclosure is illustrative only and changes may be made in detail, especially in matters of shape, size and arrangement of parts within the principle of the invention, to the full extent indicated by the broad general meaning of the terms in which the appended claims are expressed.

What is claimed is:
1. An apparatus for guiding a tractor pulling an implement, the tractor having a conventional steering apparatus, the guiding apparatus comprising:
 (a) a reversible electric motor suitably connected to a source of electrical energy for controlling said steering apparatus of said tractor;
 (b) mechanical linkage means for interconnecting said reversible electric motor to said steering apparatus of said tractor; and
 (c) first means for sending steering signals to said reversible electric motor, said first steering signal means comprising:
  (i) an elongated member for forming a trench in the surface of the ground, said elongated member being fixedly attached to the end of a rotatable shaft mountable near a first side of said implement, said elongated member being pivoted to a trench forming position as said rotatable shaft is rotated in a first direction, said elongated member being pivoted into a nontrench forming position as said rotatable shaft is rotated in a second direction;
  (ii) a wheel means for following a preformed trench in the surface of the ground, said wheel means being fixedly attached to said rotatable shaft for rotation therewith, said wheel means being raised into a non-trench following position above the surface of the ground when said rotatable shaft is rotated to said first direction, said wheel means being lowered into a trench following position as said rotatable shaft is rotated in said second direction, said wheel means including a universal joint means for enabling sideways movement of said wheel means, whereby said wheel means can follow the direction of a preformed trench when in said trench following position;
  (iii) actuator means interconnected with said rotatable shaft for rotating said rotatable shaft, said actuator means being activated under operator control;
  (iv) sensing means operatively interconnected to said wheel means for sensing the sideways movement of said wheel means, said sensing means sending steering signals to said reversible electric motor in response to said sideways movement of said wheel means; and
  (v) on/off switch means for preventing said sensing means from sending steering signals to said reversible electric motor when said wheel means is raised into said non-trench following position and enabling the sending of steering signals from said sensing means to said reversible electric motor when said wheel means is lowered into said trench following position.
2. An apparatus in accordance with claim 1 further including a second means for sending steering signals to said reversible electric motor, said second steering signal means being positioned near a second side of said implement, said second steering signal means cooperating with said first steering signal means to form a trench while said first steering signal means is following a preformed trench and vice versa.
3. An apparatus for guiding a vehicle pulling an implement, the vehicle having a conventional steering apparatus, the guiding apparatus comprising:
 (a) a reversible electric motor;

(b) mechanical linkage means for interconnecting said motor to said steering apparatus of said vehicle;

(c) first carriage means suitably attachable to said vehicle, said carriage means including:
  (i) means for removably mounting said first carriage means on said vehicle;
  (ii) means suitably attached to said first carriage means for forming a trench in the surface of the ground;
  (iii) wheel means suitably attached to said first carriage means for following a precut trench;
  (iv) actuator means for raising and lowering said wheel means;
  (v) universal joint means for enabling said wheel means to move from side to side and vertically, whereby said wheel means can remain in said precut trench should said vehicle veer from the path of the precut trench;
  (vi) a first switch normally activated when said wheel means is in a lowered position and riding in the precut trench, said first switch being deactivated when said wheel means is in a raised position; and
  (vii) a second switch normally deactivated when said wheel means is not moving sideways, said second switch being activated when said wheel means moves sideways, said second switch having first and second activated states.

(d) a plurality of conductor means electrically coupling said motor and said switches to a source of electrical energy so that deactivation of said first switch disables energizing of said motor by said second switch, activation of said first switch enables energizing of said motor by said second switch, activation of said second switch to said first activated state by movement of said wheel means in a first sideways direction energizes said motor so as to cause said linkage means to move said steering mechanism such that said vehicle is veered in a first direction, activation of said second switch to said second activated state by movement of said wheel means in a second sideways direction energizes said motor so as to cause said linkage means to move said steering mechanism such that said vehicle is steered in a second direction, whereby the vehicle does not veer from the path of the precut trench thereby enabling very accurate steering of the vehicle.

4. An apparatus in accordance with claim 3 wherein said first carriage means includes means for rotatably supporting said trench means, said trench means having a trench forming position and a nontrench forming position, said first carriage having second actuator means for raising and lowering said trench means.

5. An apparatus in accordance with claim 4 wherein said wheel means and said trench means are operatively interconnected to cooperate with each other such that when said wheel means is in said lowered position said trench means is in said non-trench forming position, said trench means being in said trench forming position when said wheel means is in said raised position.

6. An apparatus in accordance with claim 5 further comprising a second carriage means similar to said first carriage means, said first and second carriage means being constructed and arranged for mounting adjacent opposite sides of said vehicle.

7. An apparatus in accordance with claim 6 wherein said first and second carriage means are operatively interconnected to cooperate with one another such that when said wheel means of said first carriage means is in said lowered position, said trench means of said second carriage means is in said trench forming position, and when said wheel means of said second carriage means is in said lowered position, said trench means of said first carriage means is in said trench forming position, whereby as said vehicle is guided by said wheel means of one of said carriage means riding in said precut trench, said trench means of said other carriage is forming a trench in the ground for said wheel means to follow on a subsequent pass.

8. An apparatus in accordance with claim 5, further including means for sensing sideways movement of said wheel means, said sensing means activating said second switch upon detection of said sideways movement of said wheel means.

9. An apparatus in accordance with claim 8 wherein said sensing means includes a sprocket mechanism operatively interconnected to said second switch.

10. An apparatus in accordance with claim 4 wherein said first and second actuator means includes a hydraulic cylinder suitably attached to said first carriage means.

11. An apparatus in accordance with claim 10 wherein said hydraulic cylinder is suitably interconnected with a rotatable shaft and wherein said wheel means is suitably interconnected with said shaft such that extension or retraction of said cylinder rotates said shaft and raises or lowers said wheel means.

12. An apparatus in accordance with claim 11 wherein said trench means includes an elongated arm fixedly attached to the end of said rotatable shaft, said elongated arm being constructed and arranged such that when said wheel means is raised said elongated arm is pivoted into a trench cutting position and when said wheel means is lowered said elongated arm is pivoted into a non-trench cutting position.

13. An apparatus in accordance with claim 12 further including a third switch for switching said vehicle to automatic control or manual control whereby an operator can switch to manual control as needed.

14. An apparatus for guiding a tractor pulling an implement, the tractor having a conventional steering apparatus, the guiding apparatus comprising:
(a) a reversible electric motor suitably connected to a source of electrical energy;
(b) mechanical linkage means for interconnecting said reversible electric motor to said steering mechanism of said tractor;
(c) first carriage means removably attachable to said implement, said carriage means including:
  (i) means for forming a trench in the surface of the ground, said trench forming means including an elongated member fixedly attached to the end of a rotatable shaft such that as said rotatable shaft is rotated in a first direction said elongated member is lowered into a trench-forming position and as said rotatable shaft is rotated in a second direction said elongated arm is raised into a non-trench forming position;
  (ii) trench following means for following a precut trench, said trench following means being interconnected to said rotatable shaft by lift arm means such that as said rotatable shaft rotates in said first direction said trench following means is raised into a non-trench following position and as said rotatable shaft rotates in said second direction said trench following means is lowered into a trench following position;

(iii) actuator means interconnected with said rotatable shaft for rotating said shaft, said actuator means being activated under operator control;

(iv) universal joint means for enabling said trench following means to move from side to side and vertically, whereby said trench following means can remain in said precut trench should said tractor veer from the path of the precut trench;

(v) a first switch normally activated when said trench following means is in a lowered position and riding in a precut trench, said first switch being deactivated when said trench following means is in a raised position; and (vi) means for sensing sideways movement of said trench following means, said sensing means including a second switch normally deactivated when said trench following means is not moving sideways, said second switch being activated when said trench following means moves sideways, said second switch having first and second activated states, said reversible electric motor and said first and second switches being interconnected such that deactivation of said first switch disables energizing of said motor by said second switch, activation of said first switch enables energizing of said motor by said second switch, activation of said second switch to said first activated state by movement of said trench following means in a first sideways direction energizes said motor so as to cause said linkage means to move said steering mechanism such that said tractor is veered in a first direction, activation of said second switch to said second activated state by movement of said trench following means in a second sideways direction energizes said motor so as to cause said linkage means to move said steering mechanism such that said tractor is steered in a second direction, whereby said tractor does not veer from the path of a precut trench thereby enabling very accurate field work.

15. An apparatus in accordance with claim 14 wherein said trench following means includes a wheel mounted on an elongated arm by a mounting assembly, said mounting assembly being adjustable such that said wheel can be positioned at varying distances from said implement.

16. An apparatus in accordance with claim 15 wherein said wheel includes a hub and shaft combination, said shaft being pivotally mounted in a hollow rectangular bracket of said mounting assembly for pivotal movement in a substantially horizontal plane said rectangular bracket including means for adjusting the amount of pivotal movement allowed.

17. An apparatus in accordance with claim 16 further including a second carriage means similar to said first carriage means, said first and second carriage means being operatively connected to said reversible electric motor so as to be independently operative under operator control, whereby said trench following means of said first carriage means can be following a trench while said trench forming means of said second carriage means is forming a precut trench and vice versa.

* * * * *

UNITED STATES PATENT AND TRADEMARK OFFICE
CERTIFICATE OF CORRECTION

PATENT NO. : 4,484,647

DATED : November 27, 1984

INVENTOR(S) : John McGrew

It is certified that error appears in the above-identified patent and that said Letters Patent is hereby corrected as shown below:

In block [76] on the cover of the patent change information to read as follows:

Inventor: John McGrew, 1005 Cameo Dr., Thief River Falls, Minn. 56701

In Column 1, line 66 change "More ever," to --Moreover,--.

In Column 2, line 25 change "vehcile" to --vehicle--.

Signed and Sealed this

Seventh Day of January 1986

[SEAL]

Attest:

DONALD J. QUIGG

*Attesting Officer*      *Commissioner of Patents and Trademarks*